March 17, 1970 R. S. SHANE, JR 3,500,899
THERMAL VALVE
Filed Sept. 11, 1968
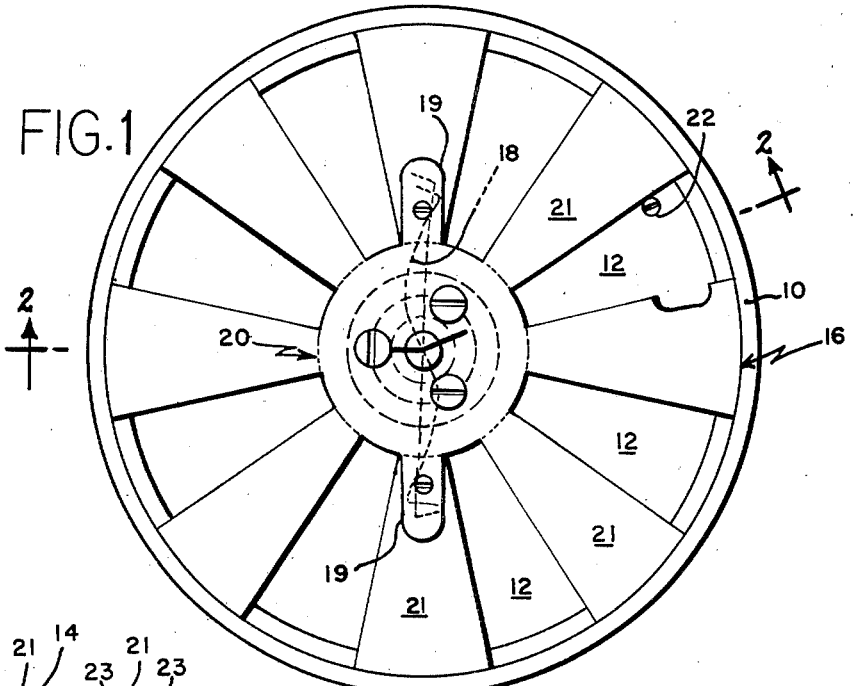
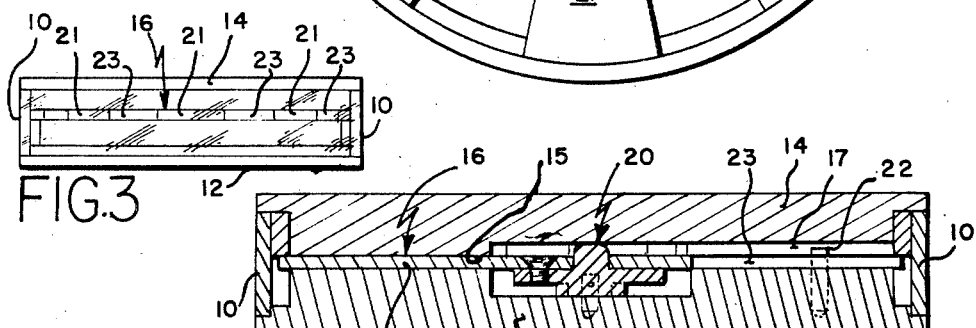
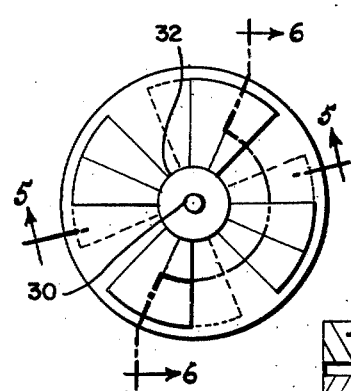
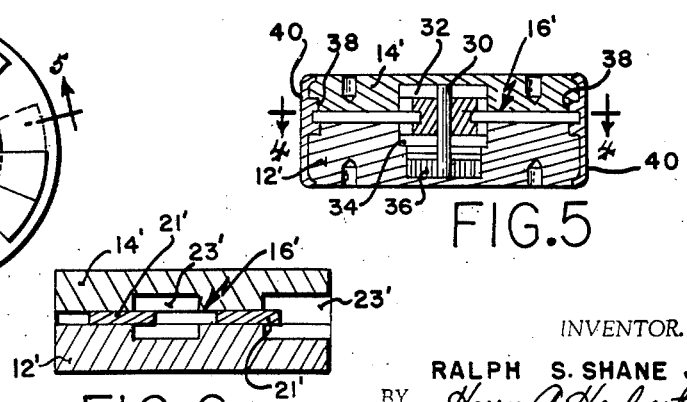
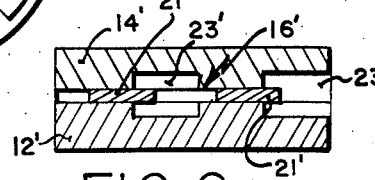
INVENTOR.
RALPH S. SHANE JR.
BY *Harry A. Herbert Jr.*
*Ruth Codier and*
ATTORNEYS

United States Patent Office 3,500,899
Patented Mar. 17, 1970

3,500,899
THERMAL VALVE
Ralph S. Shane, Jr., Saugus, Calif., assignor, by mesne assignments, to the United States of America as represented by the Secretary of the Air Force
Filed Sept. 11, 1968, Ser. No. 758,944
Int. Cl. G05d 23/00
U.S. Cl. 165—32
3 Claims

ABSTRACT OF THE DISCLOSURE

One of three aligned, vaned, valve discs is rotatable with relation to the other two for the purpose of varying the area available for heat conductivity. Heat responsive means such as a bi-metallic spiral spring, a servo drive chain, or any other effective heat responsive means moves the middle disc to vary the area of heat flow continuity, thereby maintaining temperature stability for the "package" whose heat output is being regulated.

BACKGROUND OF THE INVENTION

The invention relates to a thermal valve, and more particularly to a unit comprising three identically vaned discs mounted on a common center.

Usually a fixed thermal path is provided and heaters are used to maintain packages at a constant temperature. This type of device is inefficient, since it requires several times the power required by the equipment.

One type of device is a "thermal switch" which employs a variable pressure on flat surfaces of aluminum. In the installation of this device cold welding is a serious problem and the device becomes very costly.

SUMMARY OF THE INVENTION

The principle of operation of the thermal valve is the change of thermal resistance of a conductive path with the change of cross-sectional area. This is effected by the rotation of a metallic, radial-vane "shutter" between two parallel metal plates, the surfaces of which are formed with pie-shaped openings the same size and shape as the segments of the shutter. The shutter rotates on a shaft through its center between Teflon bushings set in each plate. A stop is provided so that the shutter may only rotate from fully closed, i.e., with the shutter blades directly between the raised segments of the parallel plates, to fully open with the shutter blades directly between the openings in the plates.

In order to obtain good thermal contact between the plates and the shutter, the clearance space between them is filled with a thermally conductive fluid. Ideally this fluid should "wet" the surfaces of the metal, have good conductivity, low surface tension and vapor-pressure, and uniform viscosity. Mercury has been used but other fluids have proven more satisfactory. An alloy trade named Vicalloy has been found to produce excellent results. The shutter should be stiff enough to prevent deforming with the forces due to surface tension and remain balanced in the space between the plates. Another possibility is ethylene glycol. Water solution of 60–40 has the lowest freezing point and best conductivity.

The shutter is rotated between its open and closed positions by a spiral spring of bi-metal strip which senses the temperature of the package and causes the thermal resistance between the plates to be proportional to the temperature of the package over the desired operating range.

The two plates are structurally fastened by any expedient means which insures an hermetic seal. This may be a metal casing around their peripheries which is rolled over a thermally insulating material. A glass cylinder performing the same function provides visual access.

The object of the invention is to produce a more efficient thermal valve, consuming considerably less power and offering greater control range. Construction problems of cold welding are eliminated.

DESCRIPTION OF THE DRAWING

FIGURE 1 is a top plan view of the device with the top vane element removed;
FIGURE 2 is a cross-sectional view taken on the line 2—2 of FIGURE 1;
FIGURE 3 is a side elevation looking into the edge of the device;
FIGURE 4 is a top plan view of a modified form of the device with the upper disc removed;
FIGURE 5 is a cross-section taken on the line 5—5 of FIGURE 4; and
FIGURE 6 is a cross-section taken on the line 6—6 of FIGURE 4 with the outer cylinder removed.

DESCRIPTION OF THE PREFERRED EMBODIMENT

Three vaned thermally conducting discs or plates 12, 14 and 16 are mounted in a cylinder 10. It is important that the cylinder 10 have insulating properties. Glass is excellent. If metal is used it must be insulated from the outer plates. In any case, the cylinder is hermetically sealed. In the device of FIGURES 1, 2 and 3, the upper disc 14 is provided with raised portions 15, and radial recesses 17 the same size and shape as the raised portions 15. The upper and lower discs 12 and 14 are fixed. The third disc or shutter 16 is mounted in any expedient manner on the common center 20 to rotate between the plates 12 and 14. Its webs 21, identical in size and shape to the spaces between them, conform in size and shape to the recesses 17 and raised portion 15, of the disc 14.

It will now be seen that the fully open position of the valve is the position which provides the greatest area of thermal continuity.

The clearances between the movable center plate and the outer plates are relatively small (of the order of 0.001 in.) and these gaps are filled as above noted with a mercury-base alloy or equivalent which will "wet" the adjacent surfaces and cause a good thermal contact between them.

When the center plate 16 is in a position where its vanes 21 coincide with the similarly projected portions of the upper plate 14, all of the vane area is in good thermal contact with each of the other plates, and the valve is "open." When it is rotated through an arc equal to the angular width of one vane, its vanes will coincide with the recesses in the upper plate and none of the vane area will be in contact with the upper plate. The valve will be "closed." In this way the thermal conductivity of the device can be varied with a ratio of the order of 200:1. Heat flow by radiation and conduction is very small.

The movement of the central disc 16 is controlled by a temperature-sensitive, torque producing device, such as a bi-metal spring 18 shown in FIGURE 1, anchored on the lugs 19 of the shutter 16, or the bi-metal spiral spring 34 of FIGURE 5.

A stop 22 is provided for limiting the motion of the shutter 16 to one vane width. Other well known devices for rotating the vane are available and can be used. For example, servo mechanisms such as a servo driven gear chain.

In the device of FIGURES 4, 5 and 6, the upper and lower discs are mounted on a central shaft 30 by means of bushings 32 and 34 which may be Teflon or similar material. The shutter 16' is operated by a bi-metal heat sensitive spiral spring mechanism 36. A guide channel 38 for the shutter is also provided in the cylindrical mounting or metal casing 40. The casing 40 structurally secures the two plates 12' and 14' around their peripheries and is rolled over to form a hermetic seal.

Operationally the two embodiments are the same. The temperature of the base, or package, is controlled by the available area of thermal continuity, and this available area is governed by a shutter movable in response to the temperature of the "package."

Although the invention has been described with reference to a particular embodiment, it will be understood to those skilled in the art that the invention is capable of a variety of alternative embodiments within the spirit and scope of the appended claims.

I claim:

1. A thermal valve, wherein the temperature of a "package" is controlled by controlling the area of thermal continuity within said package, means for controlling the area of continuity within said package, said means comprising a rotatable vaned shutter having webs and open spaces of identical size and shape, rigid discs mounted on either side of said rotatable vaned shutter, raised portions and intervening recessed portions on the surface of at least one of said rigid discs lying adjacent said shutter, the raised portions and recessed portions on said rigid discs being identical in size and shape to the webs and spaces of said shutter, the raised portions of the upper rigid disc being positioned vertically above the raised portions on said lower disc, so that when said rotatable disc is rotated, the area of thermal continuity is modified, and heat sensitive means governed by the prevalent temperature within the package for moving said rotatable disc.

2. A thermal valve as claimed in claim 1 wherein each of said rigid discs is provided with said raised portions and said recessed portions, and wherein the raised portions on one disc are aligned with the raised portions on the other and the recesses in consequence are aligned also.

3. In a thermal valve as claimed in claim 1, a thermally conductive fluid applied between the surfaces of said rotatable vaned shutter and the adjacent surfaces of said rigid discs.

References Cited

UNITED STATES PATENTS

| | | | |
|---|---|---|---|
| 2,902,262 | 9/1959 | Morse | 165—40 |
| 3,414,050 | 12/1968 | Anand | 165—32 |
| 3,399,717 | 9/1968 | Cline | 165—32 |

ROBERT A. O'LEARY, Primary Examiner

CHARLES SUKALO, Assistant Examiner

U.S. Cl. X.R.

165—96